United States Patent
Takahashi et al.

(10) Patent No.: US 10,721,022 B2
(45) Date of Patent: Jul. 21, 2020

(54) COMMUNICATION APPARATUS, COMMUNICATION METHOD, PROGRAM, AND COMMUNICATION SYSTEM

(71) Applicant: Sony Semiconductor Solutions Corporation, Kanagawa (JP)

(72) Inventors: Hiroo Takahashi, Kanagawa (JP); Takashi Yokokawa, Kanagawa (JP); Sonfun Lee, Kanagawa (JP); Naohiro Koshisaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/099,306

(22) PCT Filed: May 2, 2017

(86) PCT No.: PCT/JP2017/017224
§ 371 (c)(1),
(2) Date: Nov. 6, 2018

(87) PCT Pub. No.: WO2017/199763
PCT Pub. Date: Nov. 23, 2017

(65) Prior Publication Data
US 2019/0215100 A1 Jul. 11, 2019

(30) Foreign Application Priority Data
May 18, 2016 (JP) .................. 2016-099930

(51) Int. Cl.
*G06F 11/00* (2006.01)
*H04L 1/00* (2006.01)
(Continued)

(52) U.S. Cl.
CPC ........ *H04L 1/0061* (2013.01); *G06F 11/1032* (2013.01); *H04L 1/08* (2013.01)

(58) Field of Classification Search
CPC .................. H04L 1/0061; G06F 11/1032
See application file for complete search history.

(56) References Cited

U.S. PATENT DOCUMENTS 5,453,999 A 9/1995 Michaelson et al.
5,465,262 A * 11/1995 Dell .................... G06F 11/1044
714/800

(Continued)

FOREIGN PATENT DOCUMENTS

JP 2000-099448 A 4/2000
JP 2002-175269 A 6/2002

OTHER PUBLICATIONS

European Patent Office Communication Pursauant to Article 94(3) EPC dated Feb. 10, 2020 for related Application No. 17729204.2.

*Primary Examiner* — Esaw T Abraham
(74) *Attorney, Agent, or Firm* — Michael Best & Friedrich LLP

(57) ABSTRACT

A master includes a transmission/reception unit which transmits/receives a signal to/from a slave, and an error detection unit which detects error occurrence by performing parity check to data received by the transmission/reception unit. Then, the error detection unit performs error detection assuming one bit of 2-bit parity included in the data received by the transmission/reception unit as even parity, and the other bit as odd parity. The present technology can be applied to a bus IF which performs communication in compliance with, for example, an I3C standard.

20 Claims, 13 Drawing Sheets

(51) Int. Cl.
*G06F 11/10* (2006.01)
*H04L 1/08* (2006.01)

(56) References Cited

U.S. PATENT DOCUMENTS

| | | | |
|---|---|---|---|
| 5,566,193 A | | 10/1996 | Cloonan |
| 5,835,511 A | * | 11/1998 | Christie .................. G06F 11/10 714/802 |
| 6,543,023 B2 | * | 4/2003 | Bessios ............... H03M 13/098 714/758 |
| 7,325,155 B2 | * | 1/2008 | Trantham ............ G06F 11/1008 714/6.24 |
| 7,519,005 B2 | * | 4/2009 | Hejdeman ............... H04L 7/044 340/9.12 |
| 7,865,805 B1 | | 1/2011 | Gallagher et al. |
| 8,122,332 B2 | * | 2/2012 | Song ................. G11B 20/10009 375/341 |
| 8,127,208 B2 | * | 2/2012 | Goma .................. H03M 13/19 714/777 |
| 8,239,745 B2 | * | 8/2012 | Shintomi .............. H03M 13/09 714/801 |
| 9,389,953 B2 | * | 7/2016 | Choi .................. G06F 11/1048 |
| 2015/0121164 A1 | * | 4/2015 | Kamali .................. G06F 11/10 714/758 |

* cited by examiner

COMMUNICATION APPARATUS, COMMUNICATION METHOD, PROGRAM, AND COMMUNICATION SYSTEM

TECHNICAL FIELD

The present disclosure relates to a communication apparatus, a communication method, a program, and a communication system, and more specifically relates to a communication apparatus, a communication method, a program, and a communication system which are capable of performing communication more reliably.

CROSS REFERENCE TO RELATED APPLICATIONS

This application claims the benefit of Japanese Priority Patent Application JP 2016-099930 filed on May 18, 2016, the entire contents of which are incorporated herein by reference.

BACKGROUND ART

As a bus interface (IF) used for communication between a plurality of devices through a bus in a board mounting the devices, for example, an Inter-Integrated Circuit (I2C) has been widely used.

Furthermore, it has been desired to increase the speed of the I2C recently, and an Improved inter Integrated Circuit (I3C) has been defining as a standard for the next-generation. In the I3C, a master and a slave can perform communication bidirectionally using two signal lines, and, for example, data transfer from the master to the slave (write transfer) and data transfer from the slave to the master (read transfer) are performed.

For example, Patent Literature 1 discloses a digital data processing system in which a host processor and a subsystem controller are interconnected by an I2C. Furthermore, Patent Literature 2 discloses a method for implementing a communication protocol arranged in layers on the standard I2C protocol.

CITATION LIST

Patent Literature

PTL 1: JP 2000-99448 A
PTL 2: JP 2002-175269 A

SUMMARY OF INVENTION

Technical Problem

Incidentally, in the above described I3C, it is defined that, for example, a master and a slave perform error detection by parity, cyclic redundancy check (CRC), or the like, but a signal for which the error detection is not prepared is also transmitted/received. Thus, when an error occurs in a signal for which the error detection is not prepared, the I3C is sometimes in a state in which both of the master and the slave do not drive a data signal line. Thus, there is a concern that it may be difficult to, for example, detect whether received data is correct, and to perform normal communication.

The present disclosure has been made in view of such a situation, and is to perform communication more reliably.

Solution to Problem

A communication apparatus of a first aspect of the present disclosure includes a transmission/reception unit which transmits/receives a signal to/from another communication apparatus, and an error detection unit which detects error occurrence by performing parity check to data received by the transmission/reception unit, in which the error detection unit performs error detection assuming one bit of 2-bit parity included in the data as even parity, and the other bit as odd parity.

A communication method or a program of the first aspect of the present disclosure includes transmitting/receiving a signal to/from another communication apparatus, detecting error occurrence by performing parity check to received data, and performing error detection assuming one bit of 2-bit parity included in the data as even parity, and the other bit as odd parity.

In the first aspect of the present disclosure, the error occurrence is detected by transmitting/receiving a signal to/from the other communication apparatus, and performing parity check to received data. Then, the error detection is performed assuming one bit of 2-bit parity included in the data as even parity, and the other bit as odd parity.

A communication system of a second aspect of the present disclosure includes a first communication apparatus which has control initiative in a bus, and a second communication apparatus which performs communication according to control by the first communication apparatus, in which the first communication apparatus and the second communication apparatus each include a transmission/reception unit which transmits/receives a signal, and an error detection unit which detects error occurrence by performing parity check to data received by the transmission/reception unit, and the error detection unit performs error detection assuming one bit of 2-bit parity included in the data as even parity, and the other bit as odd parity.

In the second aspect of the present disclosure, the error occurrence is detected by transmitting/receiving a signal, and performing parity check to received data. Then, the error detection is performed assuming one bit of 2-bit parity included in the data as even parity, and the other bit as odd parity.

Advantageous Effects of invention

According to the first and second aspects of the present disclosure., it is possible to perform communication more reliably.

DESCRIPTION OF EMBODIMENTS

Hereinafter, a specific embodiment to which the present technology is applied is described in detail with reference to the drawings.

<Configuration Example of Bus IF>

Figure 1:
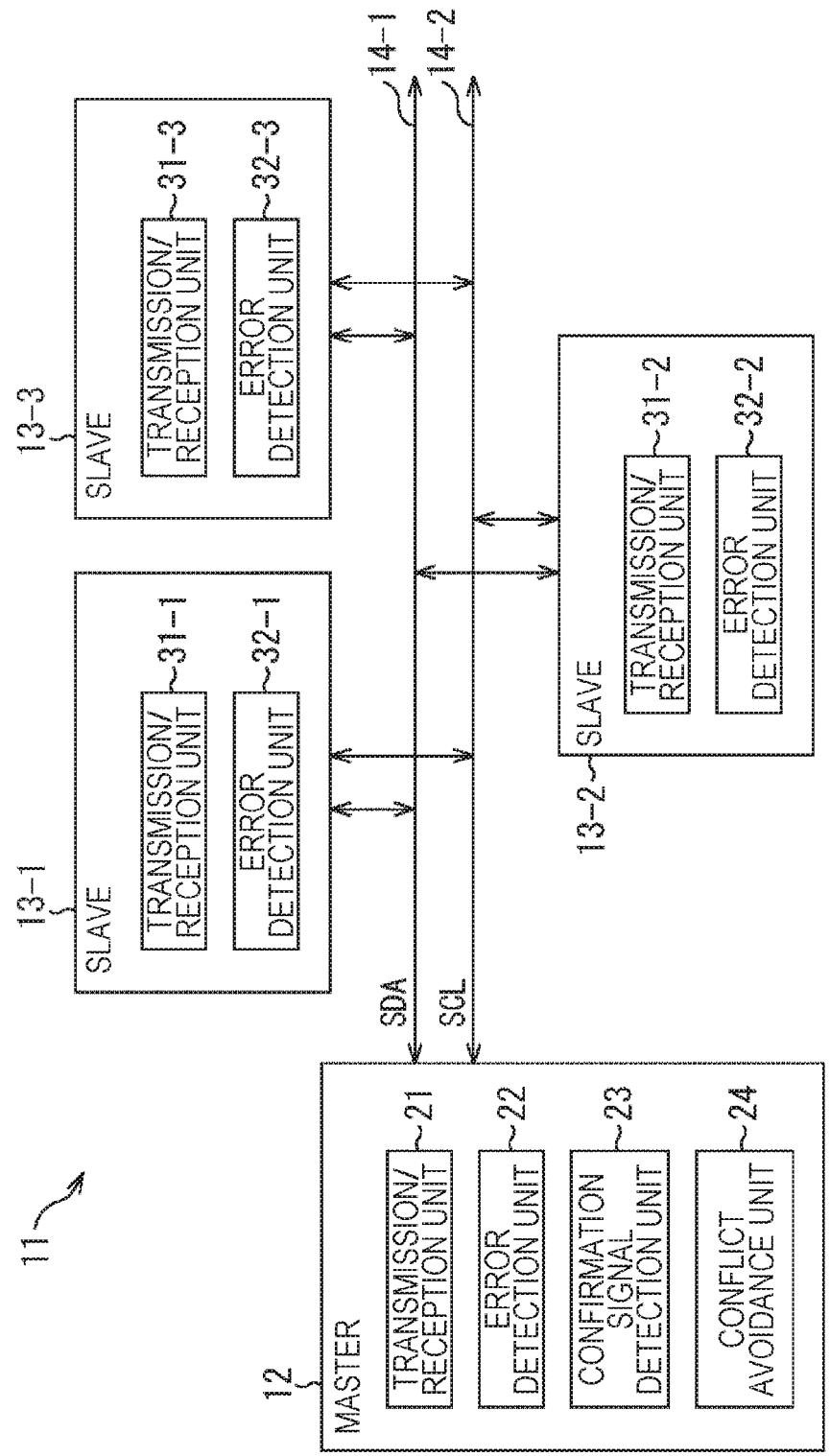
FIG. 1 is a block diagram illustrating a configuration example of an embodiment of a bus IF to which the present technology is applied.

FIG. 1 is a block diagram illustrating a configuration example of an embodiment of a bus IF to which the present technology is applied.

A bus IF 11 illustrated in FIG. 1 is configured by connecting a master 12 with three slaves 13-1 to 13-3 through a data signal line 14-1 and a clock signal line 14-2.

The master 12 has the control initiative in the bus IF 11, and can communicate with the slaves 13-1 to 13-3 through the data signal line 14-1 and the clock signal line 14-2.

The slaves 13-1 to 13-3 can communicate with the master 12 through the data signal line 14-1 and the clock signal line 14-2 according to the control by the master 12. Note that, the slaves 13-1 to 13-3 are configured similarly to each other, and are, hereinafter, simply referred to as the slave 13 unless they need to be distinguished, and which is similarly apply to each block included in the slave 13.

The data signal line 14-1 and the clock signal line 14-2 are used to transmit a signal between the master 1:2 and the slave 13. For example, in the bus IF 11, serial data (SDA) is sequentially transmitted bit by bit through the data signal line 14-1, and a serial clock (SCL) having a predetermined frequency is transmitted through the clock signal line 14-2.

Furthermore, in the bus IF 11, a plurality of transmission systems having different communication speed is defined in compliance with the I3C standard, and the master 12 can switch these transmission systems. For example, in the bus IF 11, a Standard Data Rate (SDR) mode in which data communication is performed at a normal transfer rate, and a High Data Rate (HDR) mode in which data communication is performed at a transfer rate higher than the SDR mode are defined according to a transfer rate of data. Furthermore, in the HDR mode, three modes of a Double Data Rate (DDR) mode, a Ternary Symbol Pure-Bus (TSP) mode, and a Ternary Symbol Legacy-inclusive-Bus (TSL) mode are defined in the standard. Note that, in the bus IF 11, when communication is started, it is defined that the communication is performed in the SDR mode.

The master 12 includes a transmission/reception unit 21, an error detection unit 22, a confirmation signal detection unit 23, and a conflict avoidance unit 24.

The transmission/reception unit 21 transmits/receives a signal to/ from the slave 13 through the data signal line 14-1 and the clock signal line 14-2. For example, the transmission/reception unit 21 transmits a signal to the slave 13 by driving the data signal line 14-1 (switching electric potential to an H level or an L level) according to the timing of the serial clock transmitted by driving the clock signal line 14-2. Furthermore, the transmission/reception unit 21 receives a signal transmitted from the slave 13 by driving the data signal line 14-1 according to the timing of the serial clock of the clock signal line 14-2 by the slave 13. Note that, the master 12 drives the clock signal line 14-2 at all times. Moreover, the transmission/reception unit 21 adds parity to be described later to data to be transmitted to the slave 13, and performs the transmission.

The error detection unit 22 detects an error occurring in the signal received by the transmission/reception unit 21. For example, the error detection unit 22 can detect the error by performing parity check or cyclic redundancy check (CRC) to the signal received by the transmission/reception unit 21, or checking a token issued when a transmission right is changed from the slave 13 to the master 12. Then, when detecting that an error occurs in the signal received by the transmission/reception unit 21, the error detection unit 22 can instruct, for example, the transmission/reception unit 21 to restart the communication with the slave 13.

The confirmation signal detection unit 23 confirms whether the slave 13 has succeeded in receiving a command, data, or the like by detecting an acknowledgement signal (ACK) or a negative acknowledgement signal (NACK) transmitted from the slave 13 which has received the signal transmitted from the transmission/reception unit 21. For example, in the bus IF 11, it is defined that the slave 13 transmits the ACK to the master 12 when the slave 13 has succeeded in receiving a command, data, or the like with no error in the signal. Furthermore, in the bus IF 11, it is defined that the slave 13 transmits the NACK to the master 12 when an error occurs in the signal and the slave 13 has failed to receive a command, data, or the like.

Accordingly, the confirmation signal detection unit 23 can confirm that the slave 13 has succeeded in receiving a command, data, or the like transmitted from the master 12 when detecting the ACK transmitted from the slave 13. On the other hand, the confirmation signal detection unit 23 can confirm that the slave 13 has failed to receive a command, data, or the like transmitted from the master 12 when detecting the NACK transmitted from the slave 13.

When, for example, the NACK is detected by the confirmation signal detection unit 23, the conflict avoidance unit 24 instructs the transmission/reception unit 21 to transmit an abort signal for instructing that the communication be interrupted halfway after the predetermined number of bits following the NACK is ignored. The conflict avoidance unit 24 can thereby avoid a conflict from occurring by, for example, the read data transmitted from the slave 13 and an HDR end command transmitted from the master 12. Note that, in order to perform master abort reliably, the master 12 drives the second bit of a preamble to be transmitted/ received after the read data at all times.

Moreover, when a preamble for instructing that a CRC word be transmitted is received by the transmission/reception unit 21 and a token error or a CRC error is detected in the signal received following the preamble by the error detection unit 22, the conflict avoidance unit 24 instructs the transmission/reception unit 21 to transmit an abort signal for instructing that the communication be interrupted halfway after transmitting a clock according to the number of bits corresponding to the difference between the CRC word and the read data following the preamble. The conflict avoidance unit 24 can thereby avoid a conflict from occurring by, for example, the read data transmitted from the slave 13 and an HDR end command transmitted from the master 12.

The slave 13 includes a transmission/reception unit 31 and an error detection unit 32.

The transmission/reception unit 31 transmits/receives a signal to/from the master 12 through the data signal line 14-1 and the clock signal line 14-2. For example, the transmission/reception unit 31 receives a signal transmitted from the master 12 by driving the data signal line 14-1 according to the timing of a serial clock of the clock signal line 14-2 by the master 12. Furthermore, the transmission/reception unit 31 transmits a signal to the master 12 by driving the data signal line 14-1 according to the timing of the serial clock of the clock signal line 14-2. Moreover, the transmission/reception unit 31 adds parity to be described later to data to be transmitted to the master 12, and performs the transmission.

The error detection unit 32 detects, similarly to the error detection unit 22 of the master 12, an error occurring in the signal received by the transmission/reception unit 31. Then, when no error occurs in the signal received by the transmission/reception unit 31, the error detection unit 32 transmits an ACK informing that the reception of a command, data, or the like transmitted by the signal has succeeded from the transmission/reception unit 31 to the master 12. On the other hand, when an error occurs in the signal received by the transmission/reception unit 31, the error detection unit 32 transmits a NACK informing that the reception of a command, data, or the like transmitted by the signal has failed from the transmission/reception unit 31 to the master 12.

Moreover, when, for example, an error occurs in the signal received by the transmission/reception unit 31 and it is difficult to perform normal communication, the error detection unit 32 ignores all the communication thereafter, stops the response to the master 12, and causes the slave 13 to be in a standby state.

The bus IF 11 is configured as described above, and the master 12 and the slave 13 can transmit/receive a signal through the data signal line 14-1 and the clock signal line 14-2.

Incidentally, in the bus IF 11, it is defined that a type of the data to be transmitted next is specified using a 2-bit signal called a preamble in the DDR mode. However, since the error detection by the parity or the CRC for the preamble is not prepared, when an error occurs in the preamble, it is difficult to detect the error.

For example, when the master 12 transmits a read command to the slave 13, the first bit of the preamble transmitted following the read command is driven by the master 12, and the second bit is driven by the slave 13. For example, the master 12 specifies, by the first bit, that data is to be transmitted following the read command, and the slave 13 can transmit, by the second bit, whether the reception of the read command has succeeded. For example, the slave 13 transmits the ACK indicating that the reception of the read command has succeeded by driving the second bit of the preamble following the read command to 0, and transmits the NACK indicating that the reception of the read command has failed by driving the second bit to 1.

However, when a 1-bit error in which a 1-bit value is inverted occurs at the second bit of the preamble, it is difficult for the master 12 to detect error occurrence. Accordingly, when the slave 13 transmits the NACK indicating that the reception of the read command has failed and the 1-bit error occurs in the NACK, the master 12 erroneously recognizes that the ACK has been transmitted from the slave 13. In this case, although the master 12 becomes a standby state for waiting for the read data to be transmitted from the slave 13, the slave 13 has failed to receive the read command, and does not transmit the read data.

Figure 2:
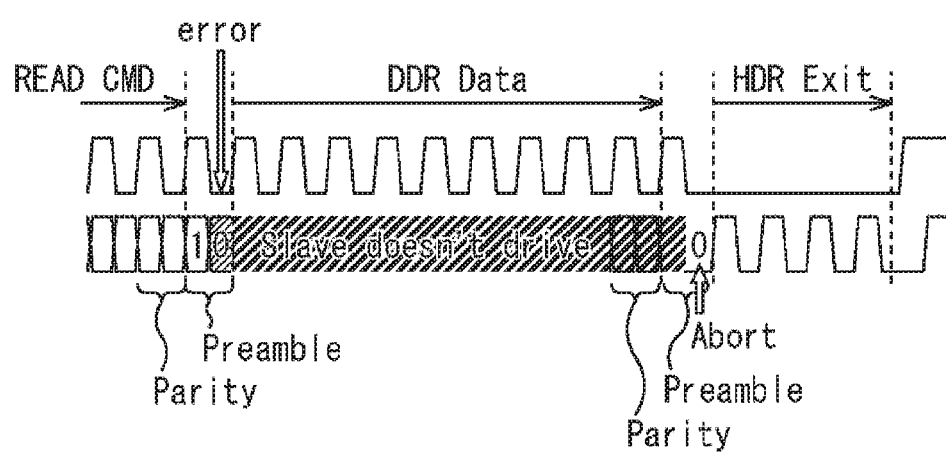
FIG. 2 is a diagram explaining an error which occurs in a preamble.

Thus, as illustrated in FIG. 2, when the 1-bit error occurs at the second bit of the preamble following the read command, both of the master 12 and the slave 13 become a state for not driving the data signal line 14-1.

Figure 3A:
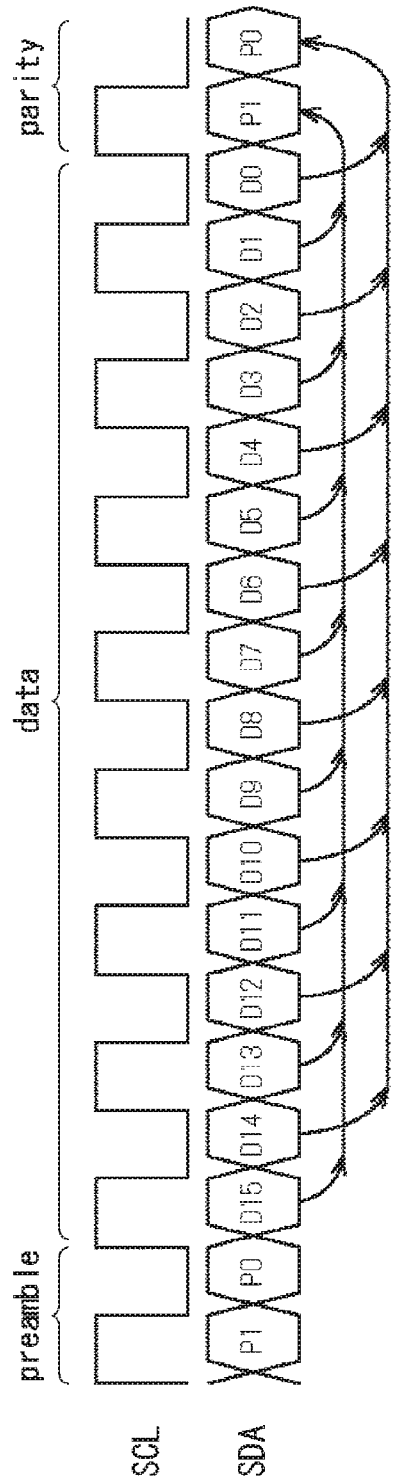
FIG. 3A is a diagram explaining error detection by parity.

Here, as described above, the error detection unit 22 of the master 12 can detect, by using a parity bit included in read data transmitted from the slave 13, an error which occurs in the read data. For example, as illustrated in FIG. 3A, the error detection unit 22 can detect whether an error occurs in data on the basis of a parity bit P1 calculated from odd bits of the data and a parity bit P0 calculated from even bits of the data. For example, normally, the parity bit P1 is set so as to take 0 when the logical disjunction of the odd bits of the data is even, and the parity bit P0 is set so as to take 0 when the logical disjunction of the even bits of the data is even.

Figure 3B:
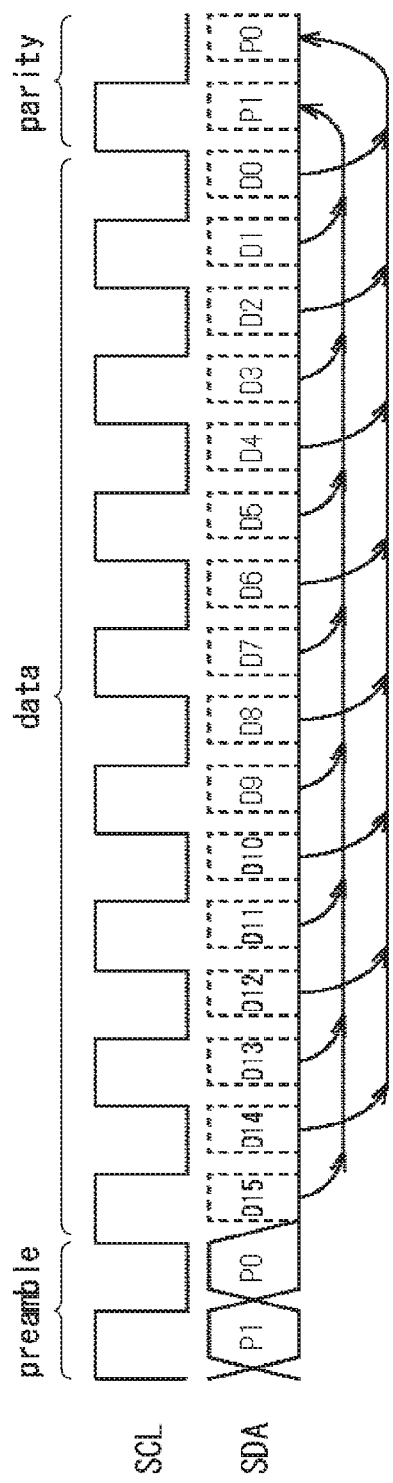
FIG. 3B is a diagram explaining error detection by parity.

Accordingly, as illustrated in FIG. 3B, when all bits of the read data are 0, both of the parity bits P1 and P0 are to be 0. Thus, when neither the master 12 nor the slave 13 drives the data signal line 14-1 while the data signal line 14-1 is not being kept at the H level (that is, while the data signal line 14-1 is being at the L level), all bits of the read data are to be 0. Accordingly, it is difficult to distinguish this case from the case in which the data all bits of which are actually 0 is transmitted.

Figure 3C:
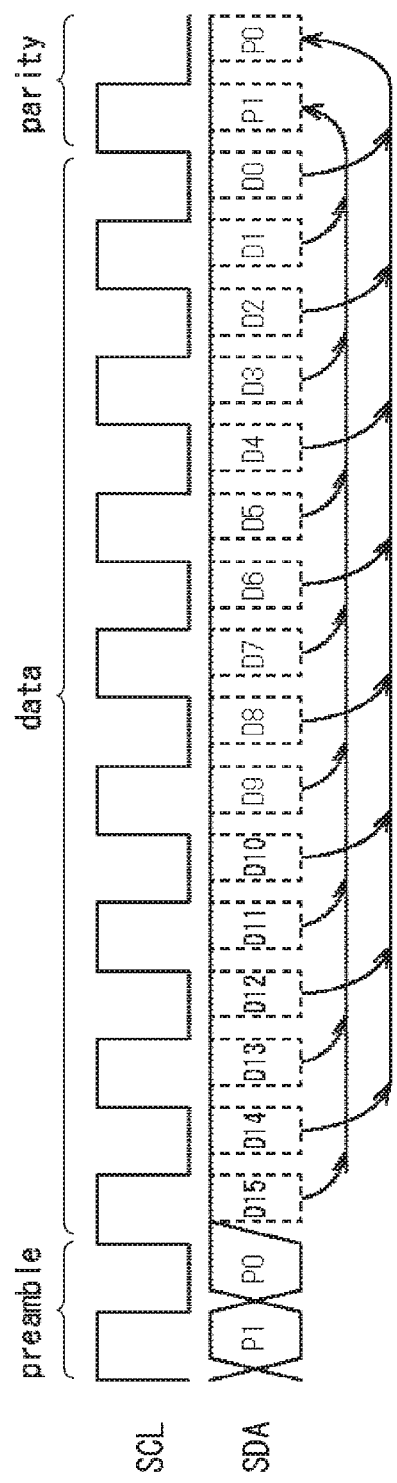
FIG. 3C is a diagram explaining error detection by parity.

Similarly, as illustrated in FIG. 3C, when all bits of the read data are 1, both of the parity bits P1 and P0 are to be 1. Thus, when neither the master 12 nor the slave 13 drives the data signal line 14-1 while the data signal line 14-1 is being kept at the H level, all bits of the read data are to be 1. Accordingly, it is difficult to distinguish this case from the case in which the data all bits of which are actually 1 is transmitted.

Thus, the error detection unit 22 of the master 12 is set so that the parity bit P1 is to be the even parity which takes 0 when the logical disjunction of the odd bits of the data is even, and the parity bit P0 is to be the odd parity which takes 0 when the logical disjunction of the even bits of the data is odd. Note that, although the configuration of the error detection unit 22 of the master 12 is described below, the error detection unit 32 of the slave 13 is configured similarly. Then, the data is transmitted after parity to be described below is attached by the transmission/reception unit 21 and the transmission/reception unit 31.

Figure 4A:
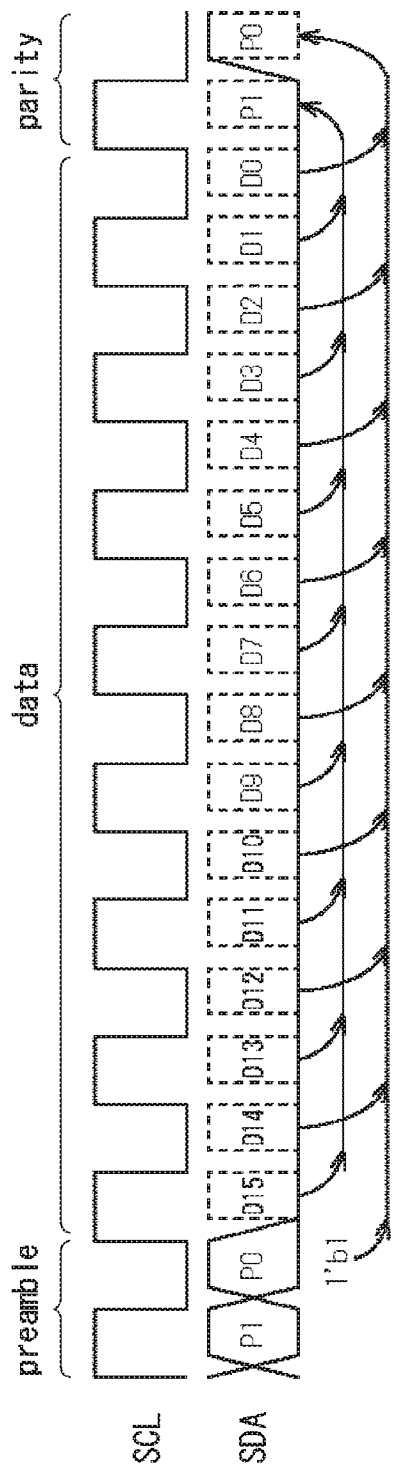
FIG. 4A is a diagram explaining error detection by parity.
Figure 4B:
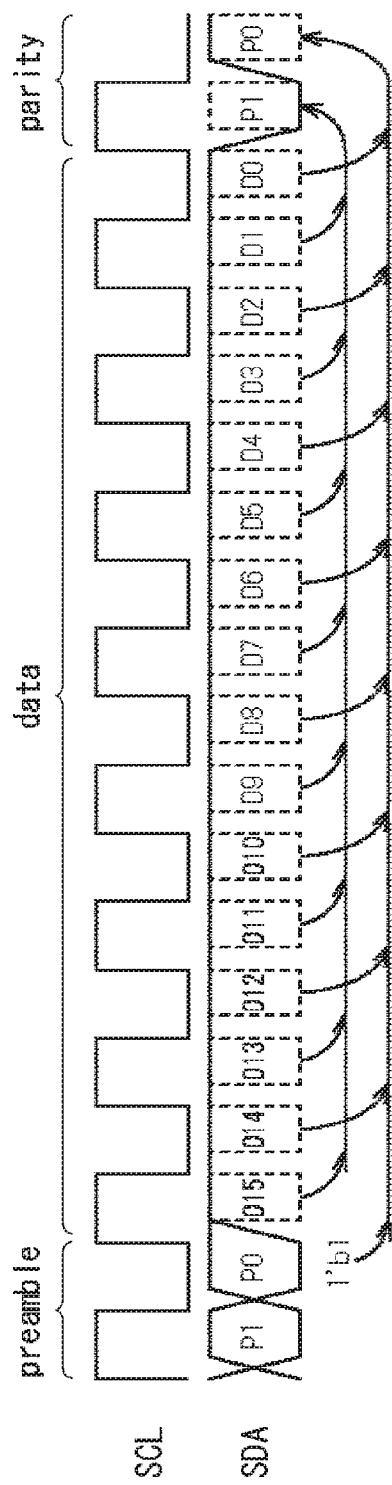
FIG. 4B is a diagram explaining error detection by parity.

Thus, when, for example, all bits of the read data are 0 as illustrated in FIG. 4A, the parity bit P1 is to be 0, and the parity bit P0 is to be 1. Similarly, when, for example, all bits of the read data are 1 as illustrated in FIG. 4B, the parity bit P1 is to be 0, and the parity bit P0 is to be 1. Thus, when neither the master 12 nor the slave 13 drives the data signal line 14-1, the error detection unit 22 can detect that the received data is not correct and an error has occurred from the fact that the parity bits are not matched.

<First Configuration Example of Parity Error Detector>

Figure 5:
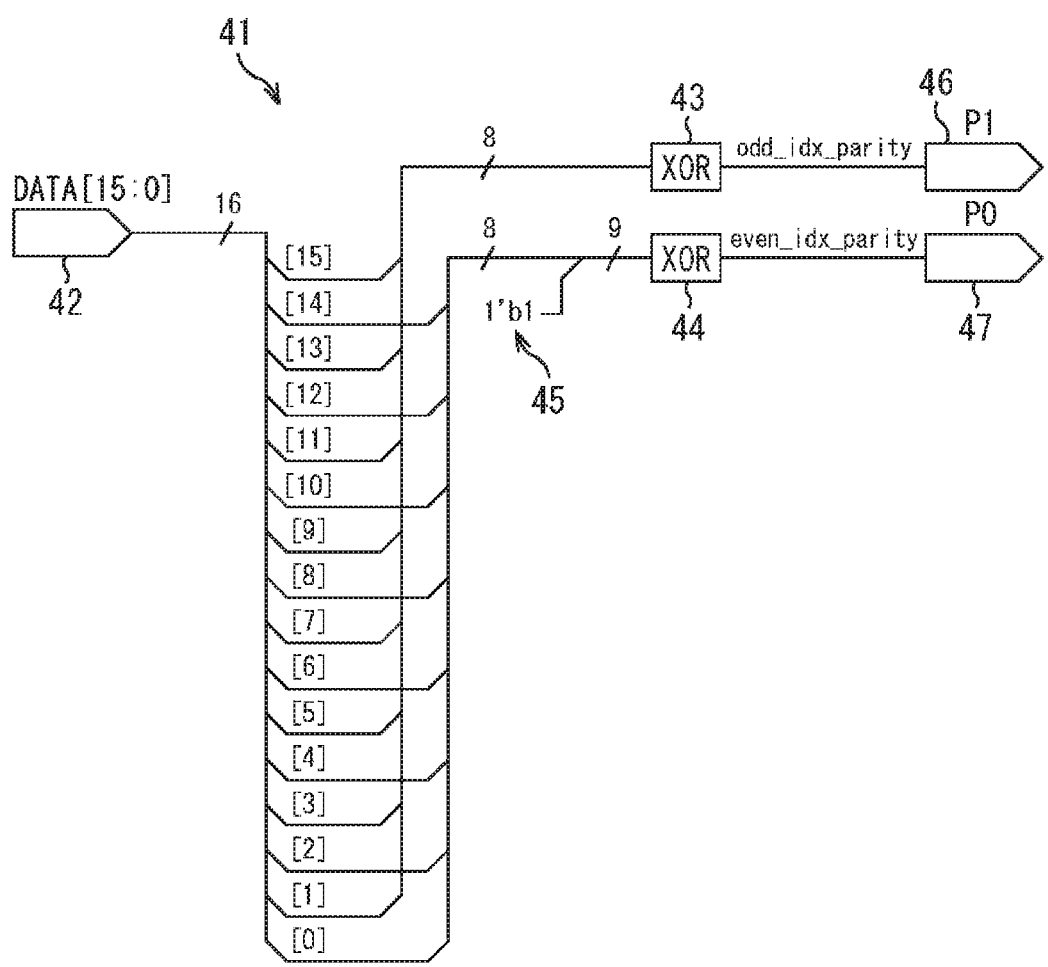
FIG. 5 is a diagram illustrating a first configuration example of a parity error detector.

The error detection unit 22 of the master 12 includes a parity error detector 41 illustrated in FIG. 5.

As illustrated in FIG. 5, the parity error detector 41 includes an input terminal 42, XOR gates 43 and 44, a one-bit addition unit 45, and output terminals 46 and 47.

To the input terminal 42 of the parity error detector 41, serial data supplied through the data signal line 14-1 is input. Then, the input terminal 42 is connected to the XOR gates 43 and 44 so that the odd bits of the serial data are supplied to the XOR gate 43, and the even bits of the serial data are supplied to the XOR gate 44.

Then, in the parity error detector 41, 1 bit of value 1 is added to the XOR gate 44 from the one-bit addition unit 45. Accordingly, the parity error detector 41 is configured so that the parity bit P1 output from the output terminal 46 is to take 0 when the logical disjunction of the odd bits of the data is even, and the parity bit P0 output from the output terminal 47 is to take 0 when the logical disjunction of the odd bits of the data is odd.

The parity error detector 41 configured in this manner can detect that the data has not been received correctly when, for example, neither the master 12 nor the slave 13 drives the data signal line 14-1 while the data signal line 14-1 is not being kept at the H level (that is, while the data signal line 14-1 is being at the L level). In other words, although all the received signals are to be 0 in this case, since the parity bit P1 is to be 0 and the parity bit P0 is to be 1, an error can be detected from the fact that the parity bits are not matched (see FIG. 4A).

Similarly, the parity error detector 41 can detect that the data has not been received correctly when, for example, neither the master 12 nor the slave 13 drives the data signal line 14-1 while the data signal line 14-1 is being kept at the H level. In other words, although all the received signals are to be 1 in this case, since the parity bit P1 is to be 0 and the parity bit P0 is to be 1, an error can be detected from the fact that the parity bits are not matched (see FIG. 4B).

Furthermore, by assuming the parity bit P1 as the even parity and the parity bit P0 as the odd parity, the parity error detector 41 can detect an error early considering the case in which, for example, the master 12 continues to keep the data signal line 14-1 at the H level. In other words, when the master 12 continues to keep the data signal line 14-1 at the H level, all bits of the data are to be 1, and it is possible to detect an error early from the fact that the parity bit P1 is to be 0.

<Communication Method for Performing Parity Check Normally>

Figure 6:
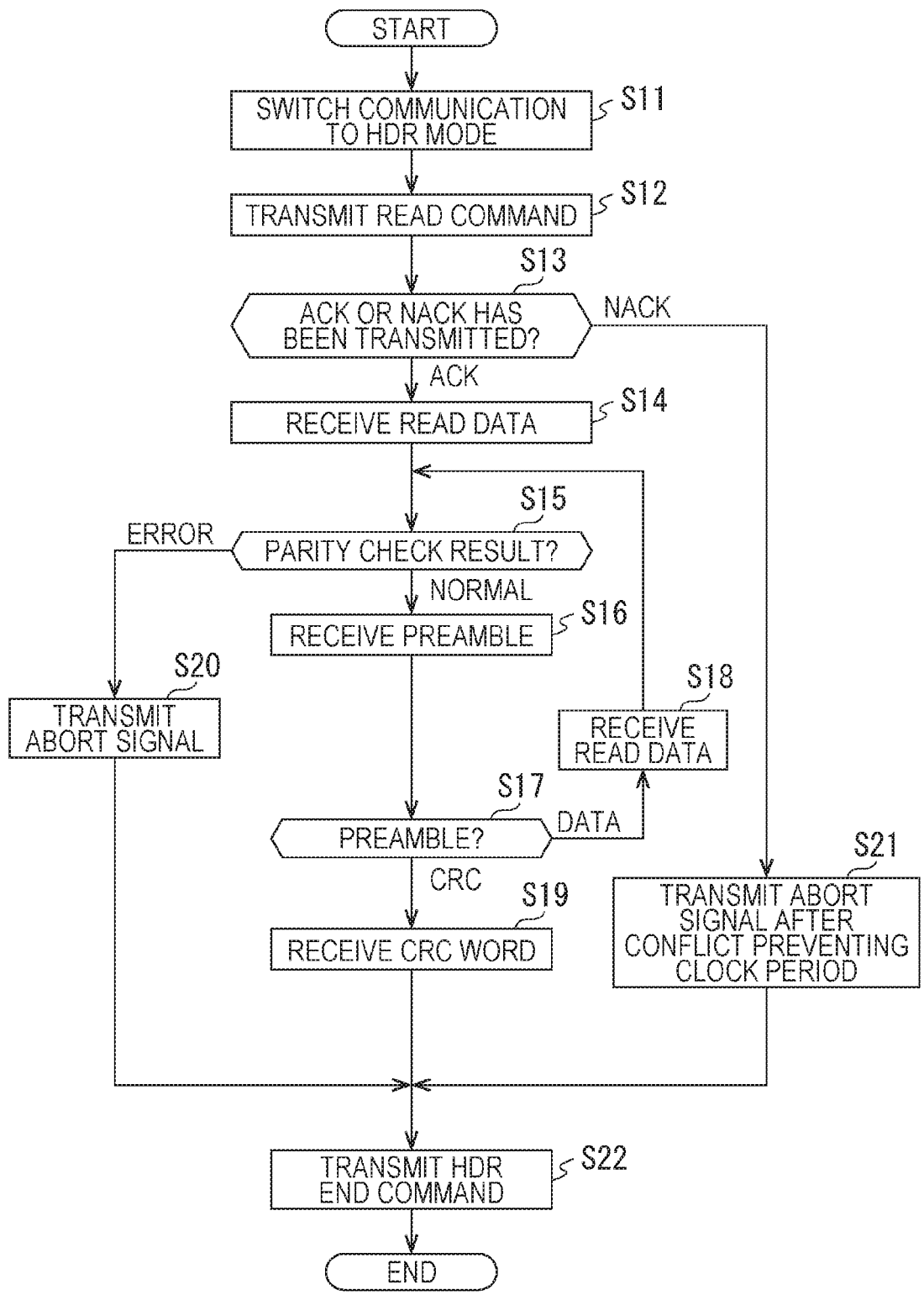
FIG. 6 is a flowchart explaining communication processing in a DDR mode of a master.

FIG. 6 is a flowchart explaining communication processing in which the master 12 reads data from the slave 13 in the DDR mode which is one of the HDR mode (DDR Read).

In step S11, the master 12 performs processing to switch communication from the SDR mode to the HDR mode. Specifically, in the master 12, the transmission/reception unit 21 drives the data signal line 14-1 and the clock signal line 14-2, and transmits a broadcast command (0x7E+R/W=0) for informing that a command is to be transmitted to all of the slaves 13 included in the bus IF 11 in the SDR mode. Thereafter, in the master 12, when the ACK transmitted from the slave 13 is received to confirm that the reception of the broadcast command has succeeded, the transmission/reception unit 21 transmits a common command code (ENTHDR CCC (0x20)) for entering the HDR mode.

In step S12, the transmission/reception unit 21 of the master 12 drives the data signal line 14-1 and the clock signal line 14-2, and transmits the read command.

In step S13, the transmission/reception unit 21 detects the value of the second bit of the preamble after the read command is transmitted, and determines whether the slave 13 has transmitted the ACK or the NACK. In other words, when detecting that the second bit of the preamble after the read command is transmitted is 0, the transmission/reception unit 21 determines that the slave 13 has transmitted the ACK. On the other hand, when detecting that the second bit of the preamble after the read command is transmitted is 1, the transmission/reception unit 21 determines that the slave 13 has transmitted the NACK.

When the transmission/reception unit 21 determines that the slave 13 has transmitted the ACK in step S13, the processing proceeds to step S14.

In step S14, the transmission/reception unit 21 receives the read data transmitted from the slave 13.

In step S15, the error detection unit 22 performs the parity check to the data received by the transmission/reception unit 21 in step S14, and determines whether an error occurs in the data. At this time, as described above with reference to FIGS. 4A and 4B, the parity bit P1 takes 0 when the logical disjunction of the odd-numbered bits of the data is even, and the parity bit P1 takes 0 when the logical disjunction of the even-numbered bits of the data is odd.

When the error detection unit 22 determines that no error occurs in the data, that is, that the data is normal in step S15, the processing proceeds to step S16, and the transmission/reception unit 21 receives the preamble following the data.

In step S17, the transmission/reception unit 21 determines whether the preamble received in step S16 specifies the data or the CRC word to be transmitted next.

When the transmission/reception unit 21 determines that the data is to be transmitted next in step S17, the processing proceeds to step S18. Then, after the transmission/reception unit 21 receives the read data, the processing returns back to step S15, and similar processing is repeated thereafter.

On the other hand, when the transmission/reception unit 21 determines that the CRC word is to be transmitted next in step S17, the processing proceeds to step S19, and the transmission/reception unit 21 receives the CRC word.

After the processing in step S19, the processing proceeds to step 522. Alternatively, when it is determined that the result of the parity check is error in step S15, the processing proceeds to step S20. Then, after the abort signal for instructing the slave 13 to suspend the processing is transmitted, the processing proceeds to step 522. Furthermore, when it is determined that the NACK has been transmitted in step S13, the processing proceeds to step S21. Then, after a conflict preventing clock period of the predetermined number of bits passes, the transmission/reception unit 21 transmits the abort signal for instructing the slave 13 to suspend the processing, and the processing proceeds to step 522.

In step S22, the transmission/reception unit 21 transmits an HDR end command, and communication processing in which the master 12 reads the data from the slave 13 in the DDR mode (DDR Read) is thereby terminated.

As described above, in the bus IF 11, when, for example, the master 12 determines that an ACK is received, it is possible to detect that the received date is not correct by performing the parity check by the error detection unit 22 although the ACK is a 1-bit error of a NACK and the data signal line 14-1 is not being driven. The master 12 thereby accurately determines whether the received data is correct or whether the data signal line 14-1 is not being driven, and can reliably perform communication.

<Second Configuration Example of Parity Error Detector>

Figure 7A:
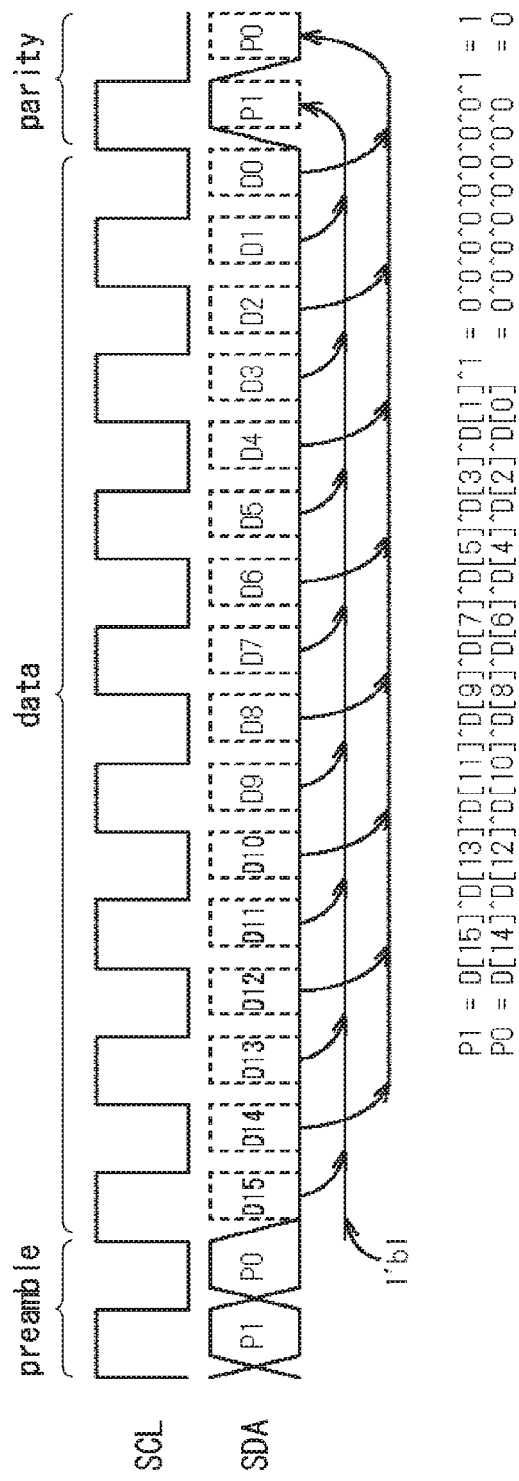
FIG. 7A is a diagram explaining error detection by parity.
Figure 7B:
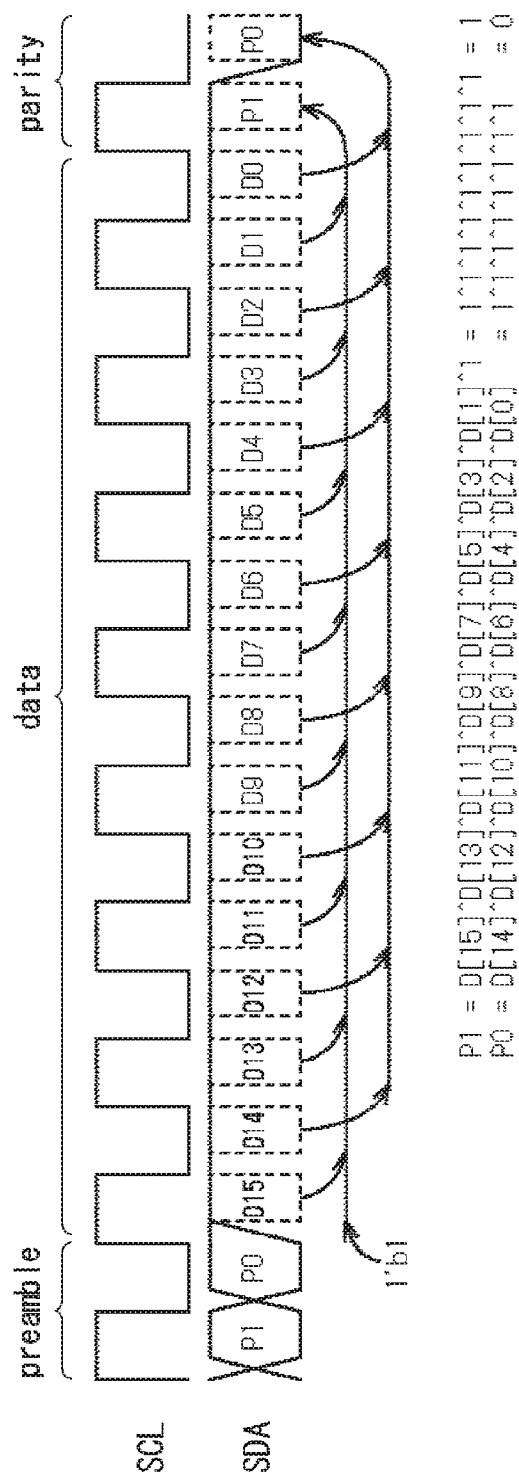
FIG. 7B is a diagram explaining error detection by parity.
Figure 8:
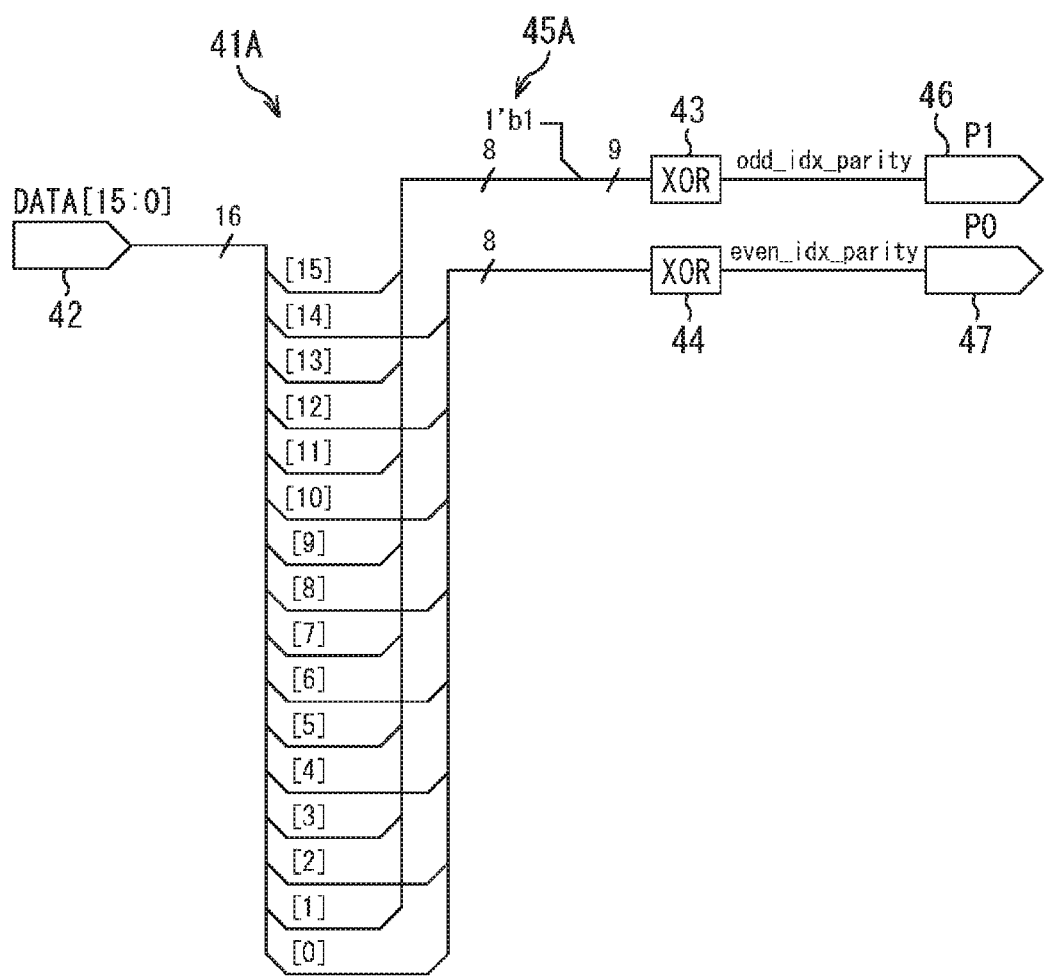
FIG. 8 is a diagram illustrating a second configuration example of a parity error detector.

With reference to FIGS. 7A, 7B, and 8, a second configuration example of the parity error detector 41 is described.

The parity error detector 41 described above with reference to FIGS. 4A, 4B and 5 is configured so that the parity bit P1 takes 0 when the logical disjunction of the odd bits of the data is even and the parity bit P0 takes 0 when the logical disjunction of the even bits of the data is odd.

In contrast to the parity error detector 41 in FIG. 5, as illustrated in FIGS. 7A, 7B, and 8, a parity error detector 41A is configured so that the parity bit P1 takes 1 when the logical disjunction of the odd bits of the data is even and the parity bit P0 takes 1 when the logical disjunction of the even bits of the data is odd.

The parity error detector 41A configured in this manner can detect that the data has not been received correctly when, for example, neither the master 12 nor the slave 13 drives the data signal line 14-1 while the data signal line 14-1 is not being kept at the H level (that is, while the data signal line 14-1 is being at the L level). In other words, as illustrated in FIG. 7A, although all bits of the read data are to be 0 in this case, since the parity bit P1 is to be 1 and the parity bit P0 is to be 0, an error can be detected from the fact that the parity bits are not matched.

Similarly, the parity error detector 41A can detect that the data has not been received correctly when, for example, neither the master 12 nor the slave 13 drives the data signal line 14-1 while the data signal line 14-1 is being kept at the H level. In other words, as illustrated in FIG. 7B, although all bits of the read data are to be 1 in this case, since the parity bit P1 is to be 1 and the parity bit P0 is to be 0, an error can be detected from the fact that the parity bits are not matched.

Note that, the present technology is not limited to the bus IF 11 in compliance with the I3C standard, and can be applied to the bus IF 11 in compliance with other standards. Furthermore, although the bus IF 11 has been connected with the slaves 13-1 to 13-3 in the configuration example illustrated in FIG. 1, the number of the slaves 13 may be, for example, one, two, or three.

Note that, each processing described above with reference to the flowchart is not necessarily performed in the order described as the flowchart in time series, and processing performed in parallel or independently (for example, parallel processing or a processing object) is included. Furthermore, the program may be executed by one CPU or a plurality of CPUs.

Furthermore, in the present specification, a system means an entire apparatus including a plurality of apparatuses.

Furthermore, the above described series of processing may be performed by hardware or software. When the series of processing is performed by software, a program constituting the software is installed, from a program recording medium recording the program, in a computer embedded in dedicated hardware or a general-purpose personal computer capable of performing various functions by installing various programs.

<Hardware Configuration Example>

Figure 9:
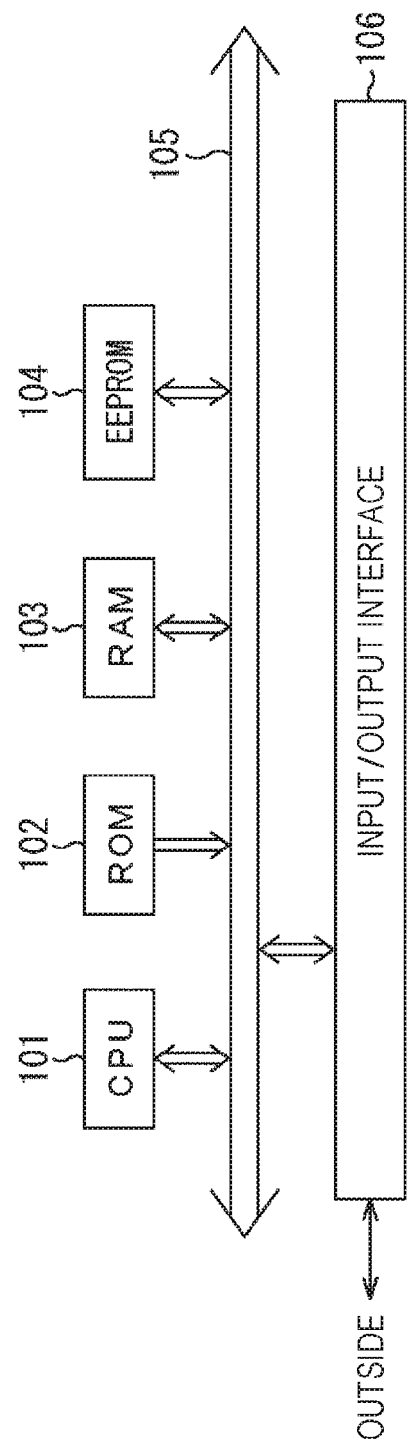
FIG. 9 is a block diagram illustrating a configuration example of an embodiment of a computer to which the present technology is applied.

FIG. 9 is a block diagram illustrating a hardware configuration example of a computer which performs the above described series of processing by a program.

In the computer, a central processing unit (CPU) 101, a read-only memory (ROM) 102, a random-access memory (RAM) 103, and an electronically erasable and programmable read only memory (EEPROM) 104 are connected with each other by a bus 105. The bus 105 is further connected with an input/output interface 106, and the input/output interface 1.06 is connected externally (for example, to the data signal line 14-1 and the clock signal line 14-2 of FIG. 1).

In the computer configured in the above manner, the CPU 101 loads and executes the program stored in, for example, the ROM 102 or the EEPROM 104 into the RAM 103 through the bus 105, and the above described series of processing is thereby performed. Furthermore, the program to be executed by the computer (CPU 101) can be not only written in the ROM 102 in advance, but also installed in the EEPROM 104 through the input/output interface 106 or updated externally.

Note that, the present technology may have the following configurations.

(1)

A communication apparatus includes:

a transmission/reception unit which transmits/receives a signal to/from another communication apparatus; and an error detection unit which detects error occurrence by performing parity check to data received by the transmission/reception unit, in which the error detection unit performs error detection assuming one bit of 2-bit parity included in the data as even parity, and the other bit as odd parity.

(2)

The communication apparatus according to (1), in which the error detection unit assumes parity calculated from odd-numbered bits of the data received by the transmission/reception unit as even parity, and parity calculated from even-numbered bits as odd parity.

(3)

The communication apparatus according to (1), in which the error detection unit assumes parity calculated from odd-numbered bits of the data received by the transmission/reception unit as odd parity, and parity calculated from even-numbered bits as even parity.

(4)

The communication apparatus according to any of (1) to (3), in which the transmission/reception unit assumes one bit of 2-bit parity to be added to data to be transmitted to the other communication apparatus as even parity, and the other bit as odd parity.

(5) The communication apparatus according to any of (1) to (4), in which the communication apparatus has control initiative in a bus, and the other communication apparatus performs communication according to control by the communication apparatus.

(6)

The communication apparatus according to any of (1) to (5), in which the communication apparatus performs communication according to control by the other communication apparatus having control initiative in a bus.

(7)

The communication apparatus according to any of (1) to (6) further includes:

an error detection unit which detects error occurrence by receiving, by the transmission/reception unit, a preamble specifying a type of data to be transmitted next and comparing a bit sequence of a signal received following the preamble with a bit sequence to be transmitted in the transmission type specified by the preamble; and a conflict avoidance unit which instructs, when the error detection unit detects the error occurrence, the transmission/reception unit to transmit an abort signal for instructing that communication be interrupted halfway after a clock according to the predetermined number of bits is transmitted following the preamble.

(8)

The communication apparatus according to any of (1) to (7) further includes:

a confirmation signal detection unit which detects either of an acknowledgement signal or a negative acknowledgement signal to be transmitted from the other communication apparatus which has received the signal transmitted from the transmission/reception unit; and a conflict avoidance unit which instructs, when the confirmation signal detection unit detects the negative acknowledgement signal, the transmission/reception unit to transmit an abort signal for instructing that communication be interrupted halfway after the predetermined number of bits following the negative acknowledgement signal is ignored.

(9)

The communication apparatus according to any of (1) to (8), in which the transmission/reception unit receives read data read from the other communication apparatus, and drives a second bit of a preamble to be transmitted/received after the read data at all times.

(10)

The communication apparatus according to any of (1) to (9), in which the transmission/reception unit is capable of transmitting/receiving a signal in a standard data rate (SDR) mode in which data communication is performed at a normal transfer rate, and in a high data rate (HDR) mode in which data communication is performed at a higher transfer rate than the SDR mode.

(11)

The communication apparatus according to any of (1) to (10), in which the transmission/reception unit performs communication through two signal lines of a data signal line which sequentially transmits serial data bit by bit and a clock signal line which transmits a serial clock having a predetermined frequency.

(12)

The communication apparatus according to any of (1) to (11), in which the transmission/reception unit performs communication in compliance with an improved Inter Integrated Circuit (I3C) standard.

(13)

A communication method includes:

transmitting/receiving a signal to/front another communication apparatus;

detecting error occurrence by performing parity check to received data; and performing error detection assuming one bit of 2-bit parity included in the data as even parity and the other bit as odd parity.

(14)

A program causes a computer to perform communication processing including:

transmitting/receiving a signal to/from another communication apparatus;

detecting error occurrence by performing parity check to received data; and performing error detection assuming one bit of 2-bit parity included in the data as even parity and the other bit as odd parity.

(15)

A communication system includes:

a first communication apparatus which has control initiative in a bus; and a second communication apparatus which performs communication according to control by the first communication apparatus, in which the first communication apparatus and the second communication apparatus each include a transmission/reception unit which transmits/receives a signal, and an error detection unit which detects error occurrence by performing parity check to data received by the transmission/reception unit, and the error detection unit performs error detection assuming one bit of 2-bit parity included in the data as even parity, and the other bit as odd parity.

Note that, the present embodiment is not limited to the above described embodiment, and can be variously modified without departing from the scope of the present disclosure.

REFERENCE SIGNS LIST

11 Bus IF
12 Master
13 Slave
14-1 Data signal line
14-2 Clock signal line
21 Transmission/reception unit
22 Error detection unit
23 Confirmation signal detection unit
24 Conflict avoidance unit
31 Transmission/reception unit
32 Error detection unit
41 Parity error detector
42 Input terminal
43, 44 XOR gate
45 One-bit addition unit
46, 47 Output terminal

The invention claimed is:

1. A communication device comprising:

transmission and reception circuitry configured to communicate with an external communication device via a data signal line and a clock signal line, the communication including transmitting and receiving data via the data signal line, the data including an expected parity and a payload, the expected parity including a first expected parity bit and a second expected parity bit; and control circuitry configured to perform a parity check to received data by calculating a first calculated parity bit and calculating a second calculated parity bit, and by comparing the first expected parity bit to the first calculated parity bit and comparing the second expected parity bit to the second calculated parity bit, wherein one of the first calculated parity bit or the second calculated parity bit is calculated by applying an XOR function to one of all odd payload bits or all even payload bits, and the other one of the first calculated parity bit or the second calculated parity bit is calculated by applying an XOR function to the other of all odd payload bits or all even payload bits adding 1.

2. The communication device according to claim 1, wherein the control circuitry is configured to calculate the first calculated parity bit using the XOR function of all odd payload bits, and to calculate the second calculated parity bit using the XOR function of all even payload bits adding 1.

3. The communication device according to claim 1, wherein the control circuitry is configured to calculate the first calculated parity bit using the XOR function of all odd payload bits adding 1, and to calculate the second calculated parity bit using the XOR function of all even payload bits.

4. The communication device according to claim 1, wherein the control circuitry is configured to determine that an error has occurred when the first expected parity bit does not match the first calculated parity bit, and/or the second expected parity bit does not match the second calculated parity bit.

5. The communication device according to claim 4, wherein, in a case where the control circuitry determines that the error has occurred, the control circuitry causes the transmission and reception circuitry to restart communication with the external communication device.

6. The communication device according to claim 4, wherein, in the case where the control circuitry determines that the error has occurred, the control circuitry causes the transmission and reception circuitry not to transmit an acknowledgement signal to the external communication device.

7. The communication device according to claim 1, wherein, in a case where the control circuitry determines that an error has occurred, the transmission and reception circuitry ignores a predetermined number of bits after not transmitting an acknowledgement signal.

8. The communication device according to claim 1, wherein the transmission and reception circuitry is configured to communicate in an SDR mode and an HDR mode, data communication being performed at a first transfer rate in the SDR mode, the data communication being performed at a second transfer rate higher than the first transfer rate in the HDR mode.

9. The communication device according to claim 8, wherein the control circuitry is configured to perform the parity check to the received data in the HDR mode.

10. A communication device comprising:
transmission and reception circuitry configured to communicate with an external communication device via a data signal line and a clock signal line, the communication including transmitting and receiving data via the data signal line, the data including a parity and a payload, the parity including a first parity bit and a second parity bit; and
control circuitry configured to calculate the parity for the data to be transmitted by the transmission and reception circuitry by calculating the first parity bit and calculating the second parity bit, and configured to append the parity to the payload,
wherein one of the first parity bit or the second parity bit is calculated by applying an XOR function to one of all odd payload bits or all even payload bits, and the other one of the first parity bit or the second parity bit are calculated by applying an XOR function to the other of all odd payload bits or all even payload bits adding 1.

11. The communication device according to claim 10, wherein the control circuitry is configured to calculate the first parity bit using the XOR function of all odd payload bits, and to calculate the second parity bit using the XOR function of all even payload bits adding 1.

12. The communication device according to claim 10, wherein the control circuitry is configured to calculate the first parity bit using the XOR function of all odd payload bits adding 1, and to calculate the second parity bit using the XOR function of all even payload bits.

13. The communication device according to claim 10, wherein the control circuitry is configured to determine whether an error has occurred and, in a case where the control circuitry determines that the error has occurred, the control circuitry causes the transmission and reception circuitry to restart communication with the external communication device.

14. The communication device according to claim 10, wherein the control circuitry is configured to determine that an error has occurred by detecting the absence of an acknowledgement signal from the external communication device.

15. The communication device according to claim 10, wherein the transmission and reception circuitry is configured to communicate in an SDR mode and an HDR mode, data communication being performed at a first transfer rate in the SDR mode, the data communication being performed at a second transfer rate higher than the first transfer rate in the HDR mode.

16. The communication device according to claim 15, wherein the control circuitry is configured to calculate the parity in the HDR mode.

17. A communication system, comprising:
a first communication device, including:
first transmission and reception circuitry configured to communicate via a data signal line and a clock signal line, the communication including transmitting and receiving data via the data signal line, the data including an expected parity and a payload, the expected parity including a first expected parity bit and a second expected parity bit, and
first control circuitry configured to calculate the expected parity for the data to be transmitted by the first transmission and reception circuitry, and to add the expected parity to the payload; and
a second communication device, including
second transmission and reception circuitry configured to communicate with the first communication device via the data signal line and the clock signal line, the communication including transmitting and receiving the data via the data signal line, and
second control circuitry configured to perform a parity check to the data received by the second transmission and reception circuitry by calculating a first calculated parity bit and calculating a second calculated parity bit, and by comparing the first expected parity bit to the first calculated parity bit and comparing the second expected parity bit to the second calculated parity bit,
wherein one of the first expected parity bit or the second expected parity bit is calculated by applying an XOR function to one of all odd payload bits or all even payload bits, and the other one of the first expected parity bit or the second expected parity bit is calculated by applying an XOR function of the other of all odd payload bits or all even payload bits adding 1, and
wherein one of the first calculated parity bit or the second calculated parity bit is calculated by applying an XOR function to one of all odd payload bits or all even payload bits, and the other one of the first calculated parity bit or the second calculated parity bit are is calculated using by applying an XOR function of to the other of all odd payload bits or all even payload bits adding 1.

18. The communication system according to claim 17, wherein the second control circuitry is configured to calculate the first calculated parity bit using the XOR function of all odd payload bits, and to calculate the second calculated parity bit using the XOR function of all even payload bits adding 1.

19. The communication system according to claim 17, wherein the second control circuitry is configured to calculate the first calculated parity bit using the XOR function of all odd payload bits adding 1, and to calculate the second calculated parity bit using the XOR function of all even payload bits.

20. The communication system according to claim 17, wherein:
the second control circuitry is configured to determine that an error has occurred when the first expected parity bit does not match the first calculated parity bit, and/or the second expected parity bit does not match the second calculated parity bit, and
in a case where the second control circuitry determines that the error has occurred, the control circuitry causes the first communication device to restart communication with the second communication device.

* * * * *